(12) United States Patent
Terrell et al.

(10) Patent No.: US 10,457,572 B2
(45) Date of Patent: Oct. 29, 2019

(54) OIL WATER SEPARATOR

(71) Applicants: Brent D. Terrell, Bardstown, KY (US); Richard E. Fogel, Mooresville, NC (US)

(72) Inventors: Brent D. Terrell, Bardstown, KY (US); Richard E. Fogel, Mooresville, NC (US)

(73) Assignee: Exactration, LLC, Shepherdsville, KY (US)

( * ) Notice: Subject to any disclaimer, the term of this patent is extended or adjusted under 35 U.S.C. 154(b) by 0 days.

(21) Appl. No.: 15/653,378

(22) Filed: Jul. 18, 2017

(65) Prior Publication Data

US 2019/0210893 A1   Jul. 11, 2019

Related U.S. Application Data

(63) Continuation-in-part of application No. 14/120,685, filed on Jun. 16, 2014, now Pat. No. 9,707,494, and a continuation-in-part of application No. 15/530,141, filed on Dec. 6, 2016.

(51) Int. Cl.
*C02F 1/40* (2006.01)
*C02F 1/28* (2006.01)
*B01D 17/02* (2006.01)
*C02F 103/34* (2006.01)
*C02F 101/32* (2006.01)

(52) U.S. Cl.
CPC ............ *C02F 1/40* (2013.01); *B01D 17/0214* (2013.01); *C02F 1/28* (2013.01); *C02F 2101/32* (2013.01); *C02F 2103/34* (2013.01); *C02F 2303/16* (2013.01)

(58) Field of Classification Search
CPC .......... C02F 1/40; C02F 1/28; C02F 2101/32; C02F 2303/16; C02F 2103/34; B01D 17/0214
See application file for complete search history.

(56) References Cited

U.S. PATENT DOCUMENTS

| 7,156,241 B2 * | 1/2007 | Hanks ................ B01D 17/0208 210/519 |
| 9,707,494 B2 * | 7/2017 | Terrell ............... B01D 17/0214 |
| 2018/0155216 A1 * | 6/2018 | Terrell ....................... C02F 1/40 |

\* cited by examiner

*Primary Examiner* — David A Reifsnyder
(74) *Attorney, Agent, or Firm* — Carrithers Law Office, PLLC; David W. Carrithers

(57) ABSTRACT

An oil water composite fluid separator apparatus designed for use in industrial applications in which unwanted tramp oils or other fluids, such as hydraulic oils, with specific gravity less than that of the operating fluid are required to be removed from operating fluid such as water, lubri-coolants or other liquids.

1 Claim, 8 Drawing Sheets

OIL WATER SEPARATOR

CROSS REFERENCES TO RELATED APPLICATIONS

This application is a Continuation-In-Part of U.S. application Ser. No. 14/120,685 filed on Jun. 16, 2014, now Issued as U.S. Pat. No. 9,707,494 and U.S. application Ser. No. 15/530,141 filed on Dec. 6, 2016, now Published as U.S. Pub. No. 2018/0155216 both of which are incorporated by reference herein in their entirety.

TECHNICAL FIELD

The present invention relates to oil water composite fluid separator apparatus designed for use in industrial applications in which unwanted tramp oils or other cutting and cleaning fluids with specific gravity less than that of the operating fluid are required to be removed from operating fluids.

BACKGROUND OF THE INVENTION

Oil-water mixtures resulting from industrial activities has produced serious pollution problems when discharged into the environment and even for facilities with wastewater treatment systems, the discharge of large volumes of oily waste water is an expensive and difficult treatment burden.

Machine parts or heat treated parts are often washed in parts washing tanks, and the washing solution is contaminated with manufacturing oils and heat treating quench oil and it is necessary to haul the oil-contaminated wash water away to disposal sites or for further separation treatment.

Furthermore, the separation of mixtures of oil and water include economic considerations, and work place safety and health. Contamination in the parts washing solutions and/or cutting, grinding, and metal processing operations contribute to an inefficient cleaning process which typically requires secondary cleaning and manufacturing steps to correct. The treatment and/or separation of fluids results in an added expense and time requirement to the manufacturing process.

Several types of treatment methods and systems have been developed in efforts to efficiently separate oil from water-oil mixtures. One treatment method is filtration, by which oil is entrapped by a filter and may be accomplished by conventional methods such as by barrier filters having bag and cartridge filters, or by membrane filters which are designed to remove emulsified oil from water. These types of filters tend to clog quickly, and are time consuming and expensive to replace.

Coalescers in horizontal separators is another conventional means to separate fluids. Coalescers are generally tightly packed beds of coalescing media or closely spaced plates, which aid in the separation of oil from water. Typical coalescer configurations are stacks of closely spaced plates, angled from vertical to horizontal. The plates may also be grooved or channeled, or wavy. Under the influence of gravity, oil separates from an oil/water mixture at a rate determined by Stokes law which predicts how fast an object will rise or fall through a heavier fluid based on the density and size of the object and the distance it must travel. In a packed media bed coalescer fluids are exposed to large amounts of surface area provided by the coalescing media. For instance, as an oil-water mixture passes through this media, oil droplets are temporarily held by the coalescing media where they are exposed to further contact with oil molecules in the mixture. This physical contact on the surface of the coalescer media has the effect of increasing or coalescing the size of the oil droplets in the mixture. In closely spaced plate and corrugated coalescing separators oil rises only a short distance where it is captured on the underside of the coalescing plates. The use of coalescers can improve the performance of horizontal separators; however, the coalescers are very susceptible to clogging in some separation processes.

Vertical separators generally involve discharge of an oil-water mixture into a vertical conduit, which is generally open at the bottom of a container such as a collecting tank. The mixture is discharged near either the upper end or the lower end of the tube and as the mixture flows into the tube, the oil rises and the water sinks, effecting separation of the two different fluids. The cleaner water is discharged from the bottom of the tube into the surrounding water, whereas the oil collects at the top of the tube. The oil may be collected be means of a tube and a pump, or it may be discharged by means of an overflow tube.

SUMMARY OF THE INVENTION

The composite fluid oil water separator is capable of isolating a first liquid from a composite fluid having a first and second liquid, in which the first and second liquid has differing specific gravities. The composite fluid oil water separator can be used primarily to remove tramp oils from cutting & cleaning fluids. The present invention includes features such as the rotating plastic (or composite) drum for mechanical removal, the automatic adjustable overflow tube for raising the liquid level during the purge cycle for purging secondary (remaining) oil that gets past the drum, and a water conveyor which is very good a moving the oil to the drum for removal. Additionally, the present invention can be used for the separation of particulate from fluids in any setting.

Oil water separators depend upon the use of gravity to separate a mixture of oil and water. Gravity separation exploits the difference in specific gravity between oil and water. Conventional gravity separators known in the art often consists of a large holding tank, in which oil rises to the surface of the water. The tanks must be substantially turbulent free to operate, and require an additional means to remove the oil. The tanks are filled and as the oil collects at the surface it is removed and the water returned for reuse or discharged. These tanks are slow, and require very large surface areas. In horizontal gravity separators, water enters at one side of a horizontal tank, and as it flows to the other side, the oil rises to the surface, where it can be collected. The cleaner water is then discharged from another side of the tank. The oil is typically collected by means of baffles which hold the oil-water interface below the top of the baffle; the floating oil which accumulates above the interface then spills over the top and into a separate compartment from which it can be collected and discharged.

The composite fluid oil water separator is capable of isolating a first liquid from a composite fluid having a first and second liquid, in which the first and second liquid has differing specific gravities. The composite fluid oil water separator can be used primarily to remove tramp oils from cutting & cleaning fluids. The present invention includes features such as the rotating plastic (or composite) drum for mechanical removal, the automatic adjustable overflow tube for raising the liquid level during the purge cycle for purging secondary (remaining) oil that gets past the drum, and a water conveyor which is very good a moving the oil to the drum for removal. Additionally, the present invention can be used for the separation of particulate from fluids in any setting.

Oil water separators depend upon the use of gravity to separate a mixture of oil and water. Gravity separation exploits the difference in specific gravity between oil and water. Conventional gravity separators known in the art often consists of a large holding tank, in which oil rises to the surface of the water. The tanks must be substantially turbulent free to operate, and require an additional means to remove the oil. The tanks are filled and as the oil collects at the surface it is removed and the water returned for reuse or discharged. These tanks are slow, and require very large surface areas. In horizontal gravity separators, water enters at one side of a horizontal tank, and as it flows to the other side, the oil rises to the surface, where it can be collected. The cleaner water is then discharged from another side of the tank. The oil is typically collected by means of baffles which hold the oil-water interface below the top of the baffle; the floating oil which accumulates above the interface then spills over the top and into a separate compartment from which it can be collected and discharged.

The present invention separates oil from an oil in water mixture starting with the oily solution entering the coalescing chamber where tramp oil in solution is allowed to rise to the surface. The oil floating on water is carried to a drum station via a water conveyor. The tramp oil adheres to the composite rotating drum and is removed from the solution. The drum speed is adjustable ranging up to a selected speed, typically up to about 9 revolutions per minute. The solution continues to flow underneath the coalescing tank and up and over a first baffle, and down and around a second baffle, and up through an adjustable overflow tube and through a solution outlet port. Oil-free solution flows out of the solution outlet port and back to the process. A purge feature is fully automatic. At a pre-set time, the cylinder actuates raising the overflow tube to a pre-set height and residual tramp oil is forced over a weir and out of a purge outlet port. The feature provides for the capture of residual tramp oils that potentially migrates past the rotating drum.

More particularly, the oil water composite fluid separator comprises a frame supporting a tank having opposing sidewalls connecting to a first end wall and a second end wall which join a pair of inclined bottom panels converging in the center forming an obtuse angle and the tank including a selected level with a fluid comprising a major amount of water and a minor amount of oil defining a water reservoir. A pump for transports an oil water composite fluid from a source to an oil water composite fluid inlet. A coalescing chamber in fluid communication with the oil water composite fluid inlet includes means for evacuating the coalescing chamber defining a drain and an opening. A coalescing chamber includes an inclined cover extending from a top edge of the second end wall inwardly over a selected portion of the coalescing chamber at a selected obtuse angle of up to about 50 degrees. The inclined cover includes a top surface and a bottom surface and an edge therebetween extending between the opposing sidewalls and defining a weir for separating a major amount of an oil and a minor amount of the oil water composite fluid from the oil water composite fluid when the coalescing chamber is filled to a selected level and the overflow of the oil water composite fluid spills over the edge and the top surface of the inclined cover defining a liquid conveyor. A mechanical oil separation chamber in fluid communication with the coalescing chamber is disposed between the opposing end walls and the coalescing chamber second end wall and a baffle end wall of a concentrate product chamber at a selected depth within the reservoir for accumulation of the major amount of oil and the minor amount of oil water composite fluid from the liquid conveyor. A rotating drum assembly includes a frame supporting a rotating drum having a bottom portion in fluid communication with the major amount of oil and the minor amount of oil water composite fluid contained in the mechanical oil separation chamber rotates at a selected speed by a motor. A concentrate product comprising a lighter density liquid oil removably adheres, absorbs, or adsorbs to a surface of the rotating drum. A wiper assembly comprises a blade extending across at least a portion of the rotating drum cooperatively engaging the surface of the rotating drum at a selected angle removing at least a portion of the concentrate product therefrom. The wiper is in fluid communication with the concentrate product chamber disposed between the opposing side walls and a reservoir end wall and the rotating drum at a selected depth. The baffle end wall extends upward adjacent the rotating drum at a height above the level of the concentrate product and above the level of the major amount of oil and minor amount of oil water composite fluid. The concentrate product chamber includes a discharge port for removal of the concentrate product. A purge oil chamber comprises an inner purge oil chamber baffle extending from the bottom panel of the coalescing chamber between the opposing side walls from a first end wall of the coalescing chamber inwardly and upward a selected distance above the level of the oil water composite fluid. An outer purge oil chamber baffle extends upward from the bottom panel of the tank and between the opposing side walls and spaced apart from the first end wall of the coalescing chamber and the first end wall of the tank a selected distance below the level of the oil water composite fluid. A clean solution chamber is disposed a selected distance above the tank floor panel and the oil purge chamber baffle extending vertically from a bottom of the clean solution chamber. A clean solution chamber in fluid communication with the oil purge chamber is disposed between the opposing side walls above the tank floor adjacent the first tank wall and in fluid communication with an adjustable outlet pipe in fluid communication with a clean water discharge port.

It is an object of the present invention to remove oil at a selected rate of about up to two gallons/hour when operating a ten gallons/minute flow rate through the unit. The unit/design is scalable to accommodate many various throughputs (inlet flow rates) and outputs (oil removal rates).

It is an object of the present invention to provide a composite fluid oil water separator for removing targeted constituencies from fluid streams based upon the different densities of the fluids.

It is another object of the present invention to provide an oil-water separator which has low maintenance and easy to operate and can be operated in-line as in an industrial setting.

It is another object of the present invention to remove tramp oils from cutting and cleaning fluids.

It is another object of the present invention to utilize a rotating drum comprised of a material which has an attractive affinity for oil and is removable.

It is another object of the present invention to utilize a rotating drum which may be covered or coated with a substance which has an affinity for a selected liquid or a suspended solid particulate matter which enhances the adhesion of the liquid or suspended solid particulate matter thereto.

It is another object of the present invention to provide a removable rotating drum including magnet means for adhering macro and microscopic magnetic metal particles.

It is another object of the present invention to provide rotating drum means for application of charged coatings or surfaces for attracting particular substrates thereto.

It is another object of the present invention to provide means for purging secondary (remaining) oil or other separated component that gets pass the rotating drum via an automatic, electric or air actuated adjustable overflow tube or weir to raise the liquid level for purging.

It is another object of the present invention to utilize a liquid conveyor (such as a water conveyor) to move the separable component (such as oil) within contact with the rotatable drum.

It is another object of the present invention to provide an oil-water separator which has a small footprint and is easy to install.

It is another object of the present invention to capture unwanted oils in solution and mechanically removes from liquid.

It is another object of the present invention to include a second stage purge cycle to eliminate accumulated, residual oils.

It is another object of the present invention to reduces disposal costs by removing oil from oil laden solutions.

It is another object of the present invention to increase the performance and life cycle costs of equipment.

It is another object of the present invention to utilize an oil water separation apparatus which provides low operating costs (5 scfm Compressed Air, ½ HP Single Phase Motor).

It is an object of the present invention to provide an apparatus for separating and concentrating oil from a water mixture based upon the specific gravity of the lighter fluid floating on the denser and heavier fluid whereby the oil contained in the water solution is processed to concentrate and remove the oil.

It is an object of the present invention to provide a composite fluid oil water separator for removing targeted constituencies from fluid streams based upon the different densities of the fluids.

It is another object of the present invention to remove tramp oils from cutting and cleaning fluids.

It is another object of the present invention to utilize a rotating drum comprised of a material which has an attractive affinity for oil and is removable.

It is another object of the present invention to utilize a rotating drum which may be covered or coated with a substance which has an affinity for a selected liquid or a suspended solid particulate matter which enhances the adhesion of the liquid or suspended solid particulate matter thereto.

It is another object of the present invention to provide a removable rotating drum including magnet means for adhering macro and microscopic magnetic metal particles.

It is another object of the present invention to provide rotating drum means for application of charged coatings or surfaces for attracting particular substrates thereto.

It is another object of the present invention to provide means for purging secondary (remaining) oil or other separated component that gets pass the rotating drum via an automatic, electric or air actuated adjustable overflow tube or weir to raise the liquid level for purging.

It is another object of the present invention to utilize a liquid conveyor (such as a water conveyor) to move the separable component having a lower specific gravity (such as oil) within contact with the rotatable drum.

It is another object of the present invention to capture unwanted oils in solution and mechanically removes from liquid.

It is another object of the present invention to include a second stage purge cycle to eliminate accumulated, residual oils.

It is another object of the present invention to reduces disposal costs by removing oil from oil laden aqueous solutions.

It is another object of the present invention to utilize an oil water separation apparatus which provides low operating costs.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
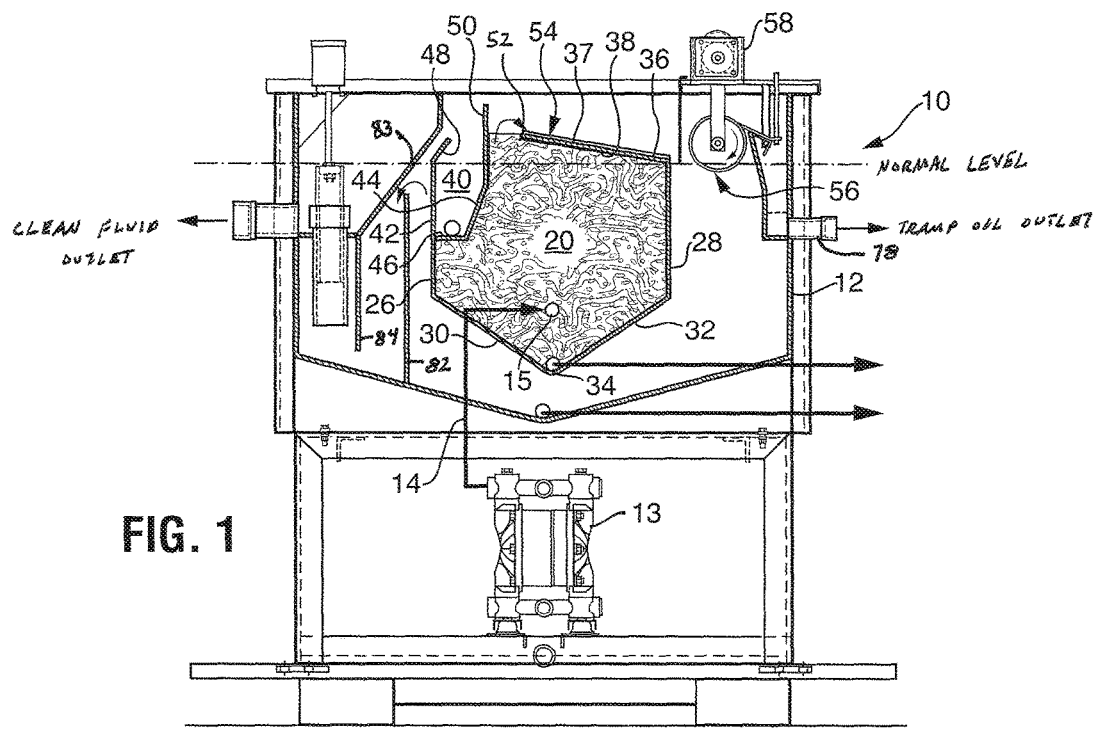
FIG. 1 shows the Quiescent/Coalescent inner chamber which receives oily solution inlet from process.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "about" can be reasonably appreciated by a person skilled in the art to denote somewhat above or somewhat below the stated numerical value, to within a range of ±10%.

For purposes of discussion, the composite fluid separator will comprise an oil and water solution wherein oil is the contaminate which is removed from the water. Of course it is contemplated that any fluids having densities or specific gravities lighter than that of water or primary solution can be removed.

The composite fluid separator unit is designed to be used in industrial applications in which unwanted tramp oils or other fluids, such as hydraulic oils, with specific gravity less than that of the operating fluid are required to be removed from operating fluid such as water, lubri-coolants, oils, or other liquids having different densities are separated one from another comprising, consisting essentially and or consisting of the apparatus and process steps described hereafter wherein the composite fluid separator will be referred by example as an oil/water separator.

As shown in the FIGS. 1-16, the present invention comprises or consists of a water tight main tank 12 including a primary quiescent/coalescent chamber 20, a liquid conveyor 54, a rotating drum 56 and gear motor assembly, drum wiper, mechanical oil separation chamber, secondary quiescent/coalescent chamber, purge oil chamber, purge oil baffle, concentrated product chamber 64, and clean fluid chamber.

The processing of the liquid containing the highest concentration of material to be separated is transferred by a pump 13 through line 14 and port 15 into the quiescent/coalescent inner chamber 20 which is centrally disposed within the main tank 12. The quiescent/coalescent chamber comprises a generally pentagon shaped tank including pentagon side walls 22, 24, a first end wall 26, and second end wall 28 connecting to a pair of inclined bottom panels 30, 32 which converge at an obtuse angle forming a drain 34 at the convergence thereof. A cover 36 having a top surface 37 and bottom surface 38 extends from the second end wall 28 a selected distance toward the first end wall 26 and extends upward at a selected obtuse angle of up to 50 degrees, more preferably from 1 to 30 degrees, more preferably from 5-20 degrees, more preferably from 7 to 15 degrees and most preferably about 10 degrees from a horizontal position forming a gradual inclined plane. A purge oil chamber 40 defining a deep vessel with narrow walls is formed within the chamber 20 wherein a top end wall portion 42 of the first end wall 26 connects to an inner purge oil chamber wall 44 by a bottom wall portion 46, all of which connect to the pentagon side walls 22, 24. A first purge oil baffle 48 projects inwardly from the end wall portion 42 at an angle of from 25 to 75 degrees and more preferably at an angle of about 45-55 degrees and most preferably an angle of about 50 degrees. A second vertical baffle 50 extends upward from the inner purge oil chamber wall 44 a distance greater than that of the first purge oil baffle 48 and the second end wall 28.

Stage 1—Quiescent/Coalescing Process

In stage 1 of the separation process, the quiescent/coalescent chamber 20 receives oily (oil/water) solution transferred through line 14 from pump 13 into inlet 15. This chamber 20 is liquid tight and is filled to a selected level so that an overflow of oil/water level occurs and the oil/water solution spills over the top surface 37 of the cover 36 wherein the top edge 52 functions as a weir and the top surface 37 of the cover 36 functions as a means of conveying the liquid mixture or as a "liquid conveyor" 54. Controlling flow rate and the level of the oil/water solution in the chamber 20 creates a slow moving laminar flow passing over the liquid conveyor whereby the chamber 20 maintains a higher fluid level than any other compartment within the unit 10. The oily solution is forced up to the water conveyor area and overflows down to a rotating drum 56.

Stage 2—Fluid Conveyor—

Figure 2:
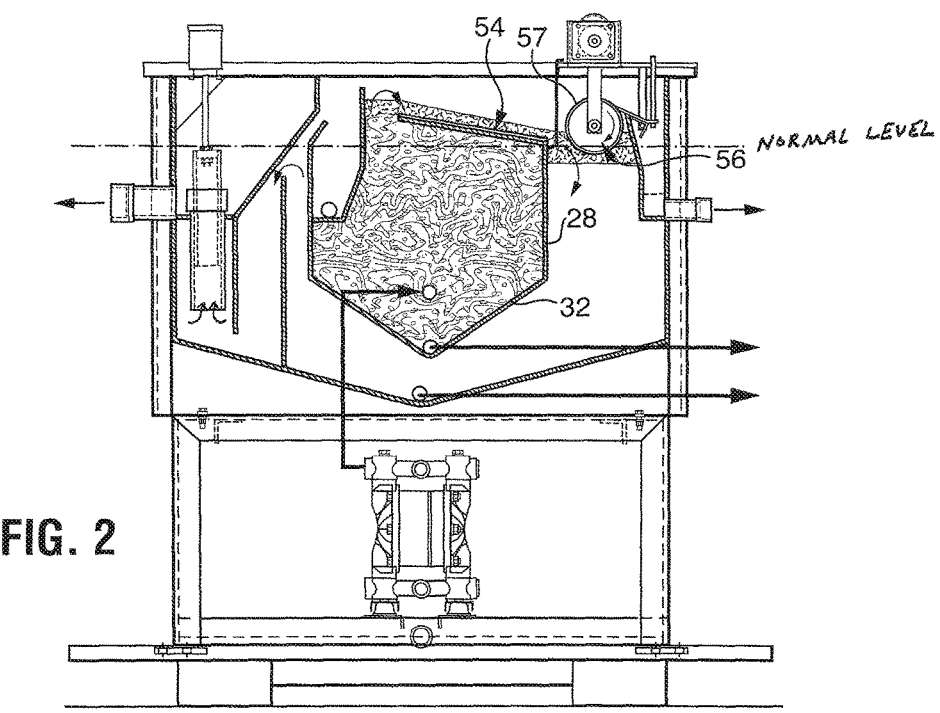
FIG. 2 shows the Water Conveyor wherein the oily solution is carried to the rotating drum for removal of tramp oil.

The fluid conveyor process is best illustrated in FIG. 2, which shows the oil/water liquid overflowing the chamber 20 and flowing down the water conveyor 54. The oily solution is carried to the rotating drum 56 for removal of tramp oil or other liquid having a density or other physical or chemical characteristic which can be utilized to create an affinity for the separable component to stick or adhere to the surface of the rotating drum. As shown, a thin layer of solution overflows the liquid conveyor weir 54 wherein the oil having less density than water tends to float to the surface of the laminar flow which carries the tramp oil to the rotating drum 56. The tramp oil floats to the surface and the "water conveyor", liquid conveyor 54 continually pushes (or conveys) the oil to the rotating drum for removal. The liquid conveyor 54 can as an option include an irregular surface with ridges, bumps, dimples or grooves on the entire surface or portions thereof to enhance the liquid component separation.

Stage 3—Mechanical Oil Separation—

The oil separation process regards the steps of separation of the fluids, (oil and water) from the oily solution by mechanical means. This section is where the lighter density fluids such as floating tramp oils are mechanically removed from the solution. The rotating drum surface is constructed from metal (copper, steel, stainless steel, aluminum, or combinations thereof) and/or plastic material (a polyethylene, a polypropylene, a nylon, a rubber, a silicon material, an elastomer, a polyvinylchloride, ABS, or other plastic materials depending upon the physical and chemical properties of the fluids to be separated such as the tramp oil/water chemical properties. Most oils have an affinity for certain types of plastics. This is a point of novelty with regard to the overall design of the unit because it allows for uses of various drum materials depending upon the chemical properties of the fluids to enhance adhesion of a selected one of the fluids to the drum. It is anticipated that more than one drum can be utilized in a series in fluid communication with the fluid conveyor as shown in FIGS. 1-16 wherein a fluid containing three separable components would contact a first drum having a component removed therefrom and the remaining fluid would flow along a fluid conveyor at least one other drum where a second component would adhere to a drum having a surface comprising a material having an affinity for another second component which would adhere thereto and be removable from the rotating drum leaving the remaining fluid flowing along the fluid conveyor to be collected for further processing or storage. Moreover, the rotating drums could be coated with a chelating substance to remove chemical toxins, heavy metals, or other chemical contaminants. The drum surface or removable sleeve 57 covering the drum may comprise a film, or metal or plastic material, comprising an impervious material or porous and be inert or covered with a carbon material for absorption of odoriferous contaminants. Moreover, the drum surface or sleeve material could comprise a micro porous substance wherein a selected portion of the liquid could pass through the rotating drum and siphoned off to a collection vessel. The drum surface and/or sleeve could also utilize surface irregularities, either macro or microscopic in size to aid in adsorption of materials. Furthermore, it is anticipated that the rotating drum may be heated by steam of hot liquid such as water or oil or cooled by a liquid such as water, water/alcohol, water/glycol, or gas to facilitate the adhesion or absorption capabilities of the rotating drum features. Moreover, the rotating drum surface or sleeve can be comprised of a material having an electric potential and carry an ionic charge attractive to selected substrates.

The rotating drum 56 is powered by a variable speed electric motor 58 which rotates the drum at an optimal selected speed based on the maximum efficiency for adherence or adsorption/absorption of the lighter density material to the drum. For example, in the process of removing tramp oil from an oil solution such as water, the drum rotates at approximately 7 RPM using a low voltage gear motor. The gear motor also includes a speed controller such that the drum rotation can be increased or, for example removing tramp oil from water, slowed to 1 RPM (or less) depending upon the need. The drum and gear motor assembly is modular in that it can be easily removed for repair. This assembly also incorporates vertical adjustment to control the immersion depth of the drum 56 in solution.

Figure 3:
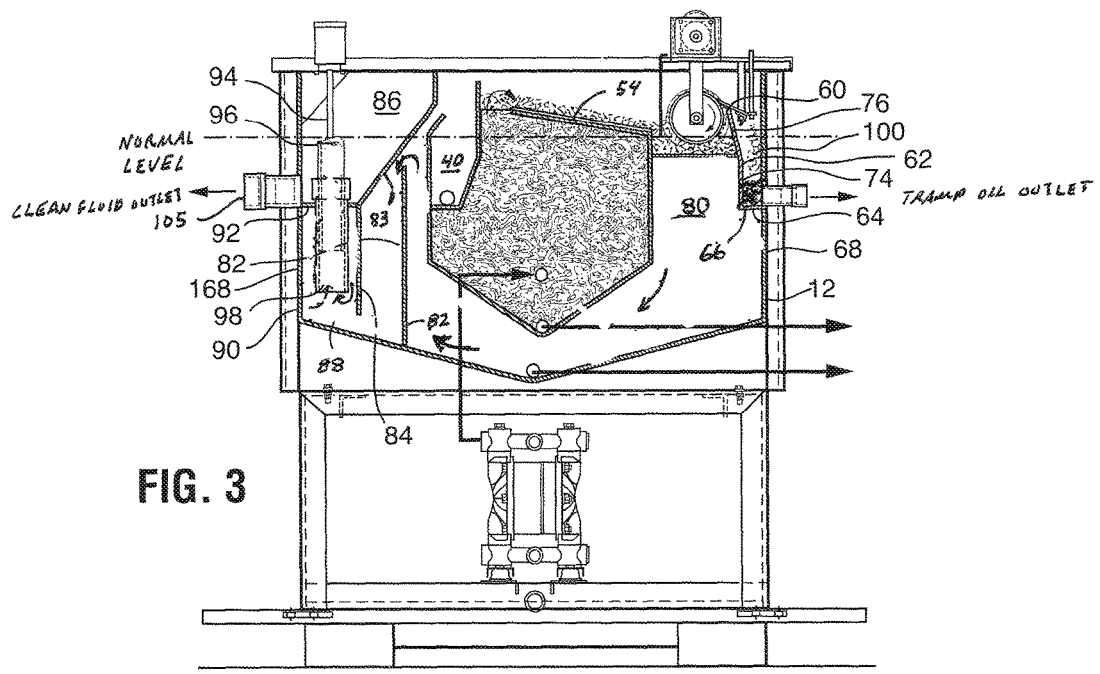
FIG. 3 shows the Mechanical Oil Separation wherein the floating tramps oils are mechanically removed from the solution.

As shown in FIGS. 2-6, the lighter density fluid component, for example, the tramp oil or concentrated fluid product 100 adheres to the clockwise rotating drum and is removed by a wiper 60 comprising a blade of metal or plastic material which extends across at least a portion of the rotating drum and cooperatively engages the rotating drum 56 surface or sleeve 57 surface and may touch or be spaced apart therefrom a selected distance depending upon the physical and chemical properties of the concentrated fluid product 100 sufficient to remove all or most of the concentrated product. The wiper 60 as shown in FIG. 3 is spaced apart from the rotating drum. The wiper 60 is supported by a baffle which forms and inner baffle end wall 62 to a concentrated product chamber 64 which includes a bottom wall 66 connecting to a first tank end wall 68 of the main tank 12. The baffle end wall 62, bottom wall 66 and a first tank end wall 68 connect to the first tank side wall 70 and second tank side wall 72. As shown, a submerged lower portion 74 of the baffle end wall 62 is spaced apart parallel from the tank end wall 68 and an upper portion 76 of the baffle end wall 62 projects inwardly toward the rotating drum at an obtuse angle. The wiper 60 is attached to the upper portion 76 so that it projects at a selected angle therefrom for cooperative engagement and optimal removal of the concentrate product 100 from the rotating drum 56. A discharge port 78 formed in the tank wall 68 is in fluid communication with the concentrated product to drain or collect same from the unit 10.

Figure 4:
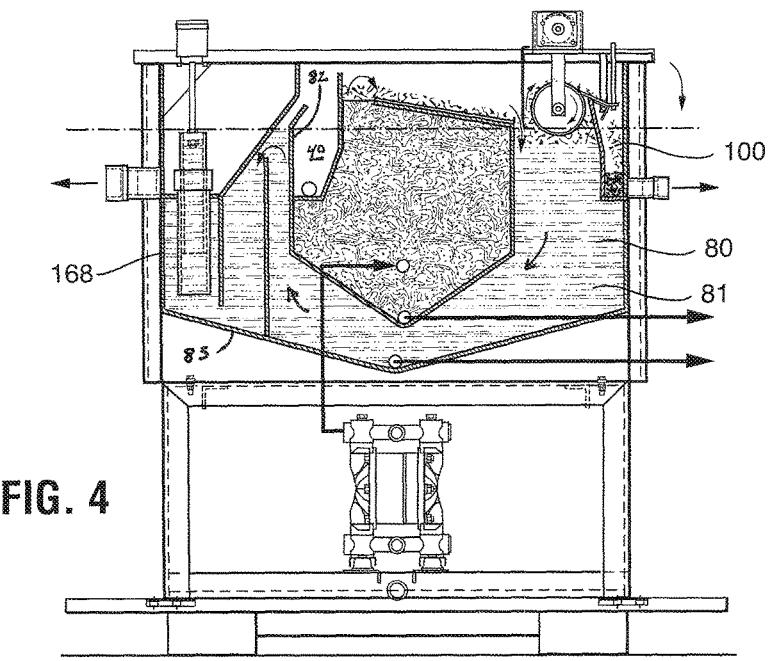
FIG. 4 shows the Secondary Quiescent/Coalescent chamber which is a continuation of the Mechanical Oil Separation chamber of FIG. 3 designed to allow more retention time within the unit for separation of fluids.
Figure 5:
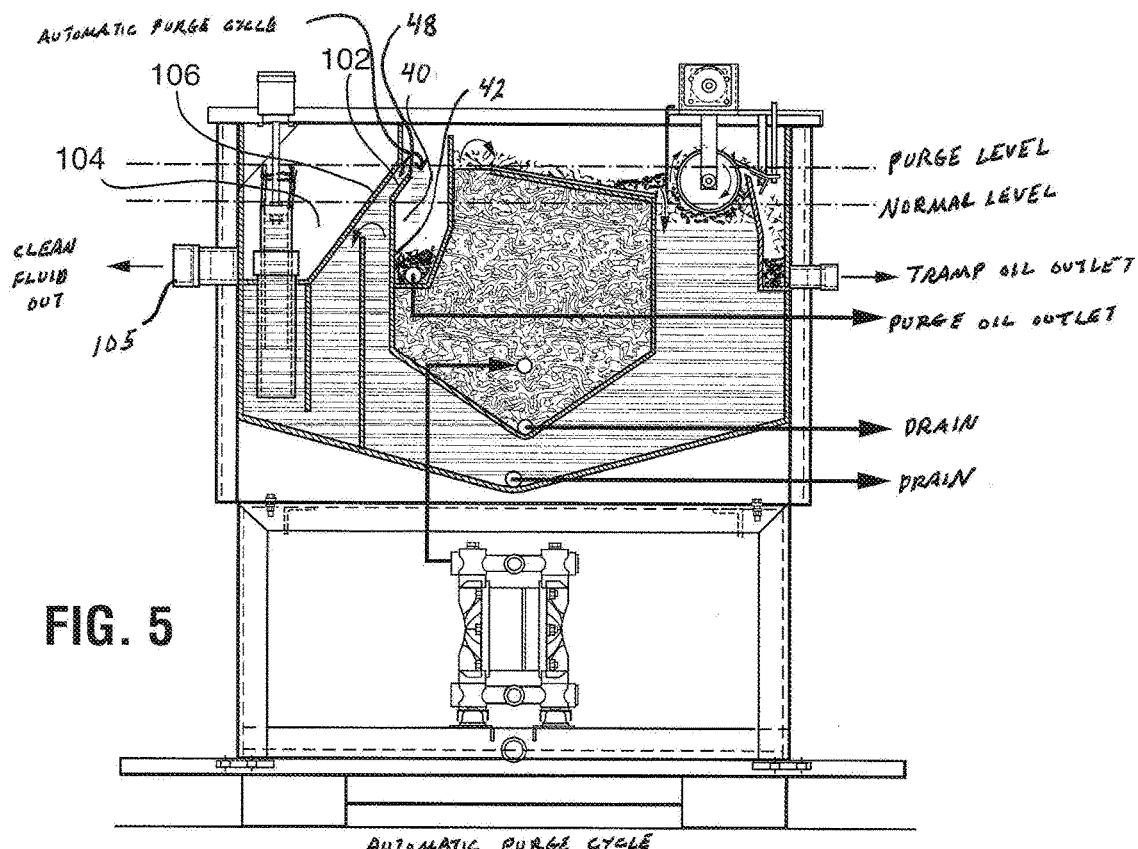
FIG. 5 shows the Oil Purge Chamber which receives any residual tramp oils that was not removed by the rotating drum wherein the tramp oils are allowed to continually build on the surface of the solution for a period of time.
Figure 6:
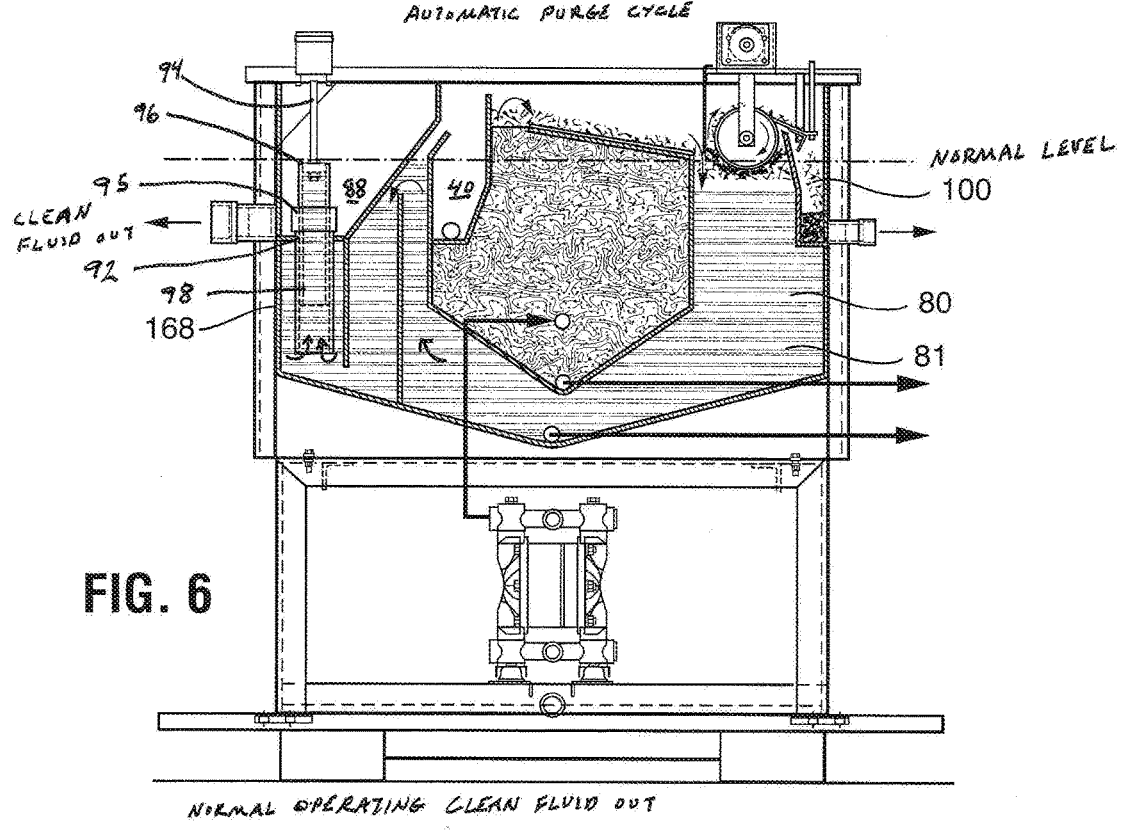
FIG. 6 shows the Clean Solution, Adjustable Outlet wherein the chamber receives clean solution from Stage 4 shown in FIG. 4 and the clean fluid flows up through an adjustable outlet pipe and discharges out to process.
Figure 7:
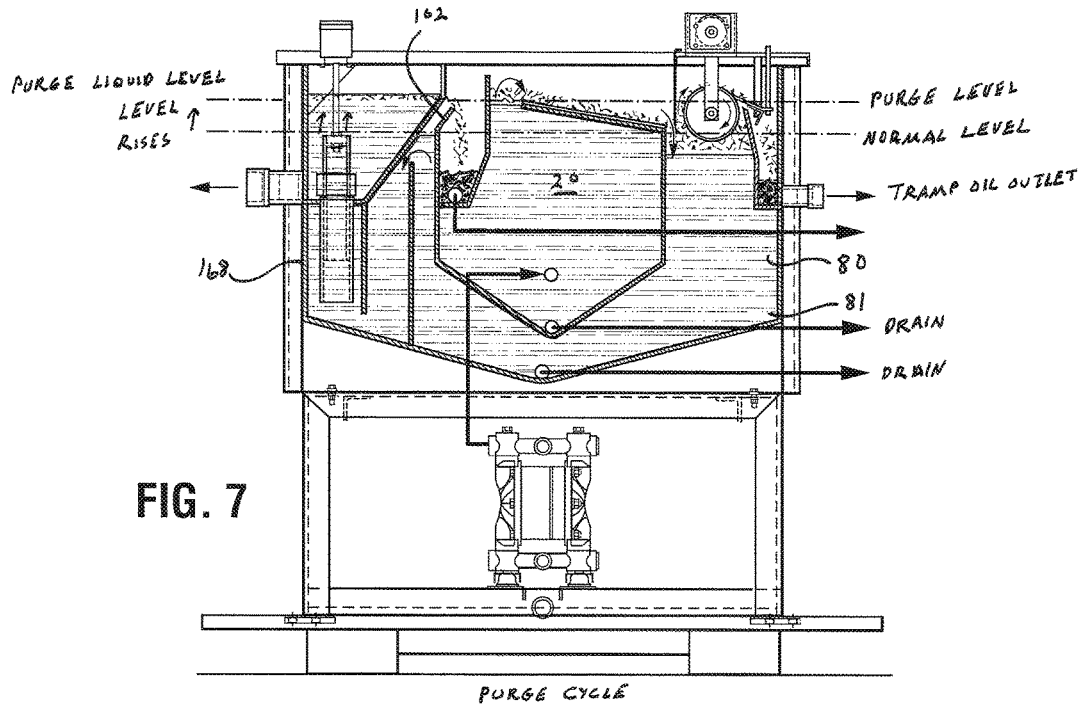
FIG. 7 shows the purge cycle and circulation of the composite feed fluid, concentrate product (tramp oil outlet), purge oil outlet, and clean fluid outlet.
Figure 8:
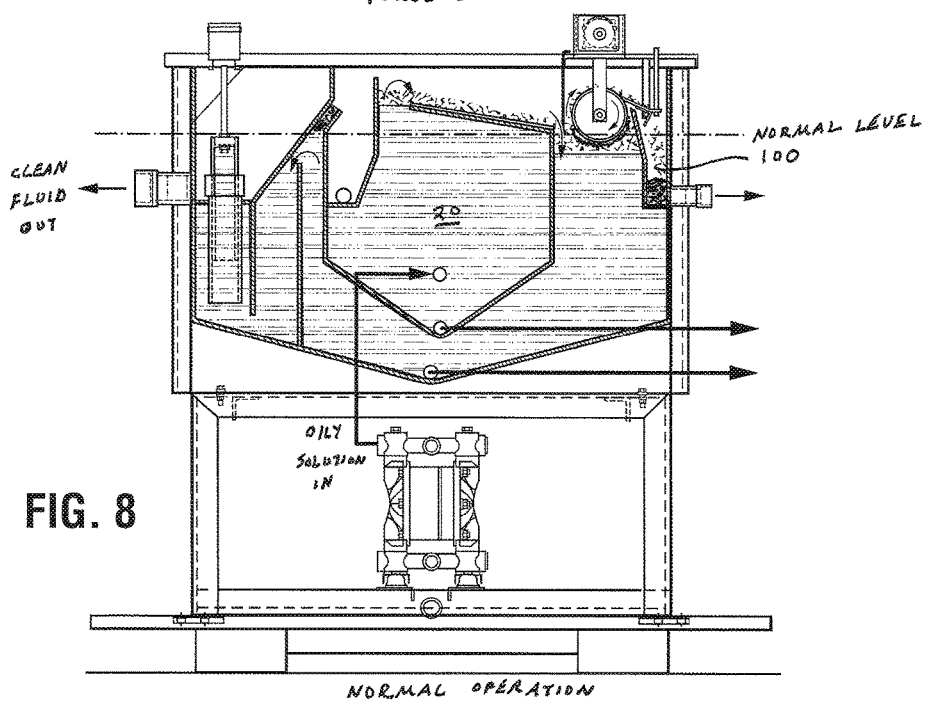
FIG. 8 shows the separation unit circulation of the composite feed fluid, concentrate product, purge product outlet, and clean fluid outlet.
Figure 9:
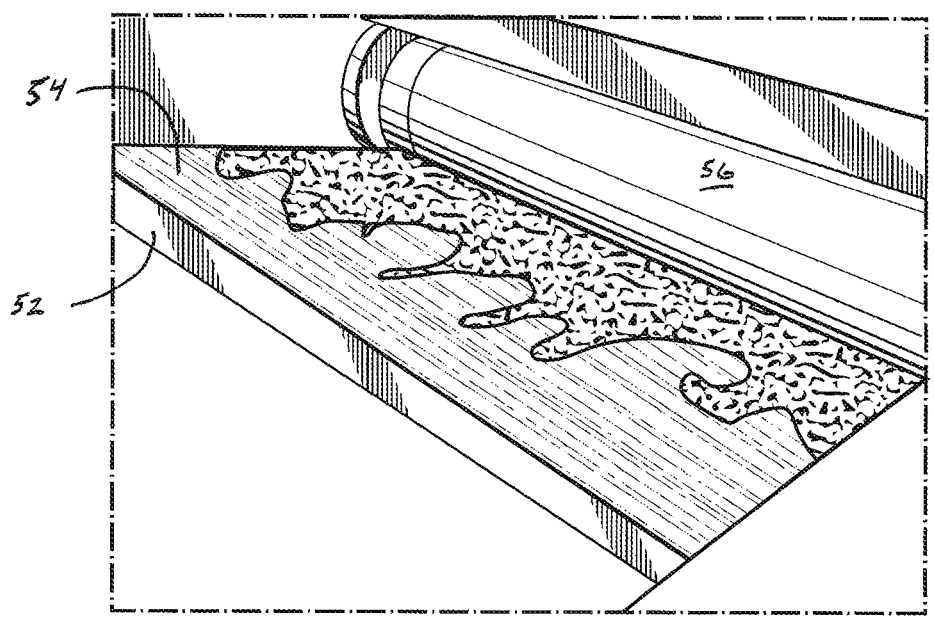
FIG. 9 shows the laminar flow of the lighter density fluid component comprising an oil floating on the higher density fluid component water over the fluid conveyor in close proximity to the rotating drum separator.
Figure 10:
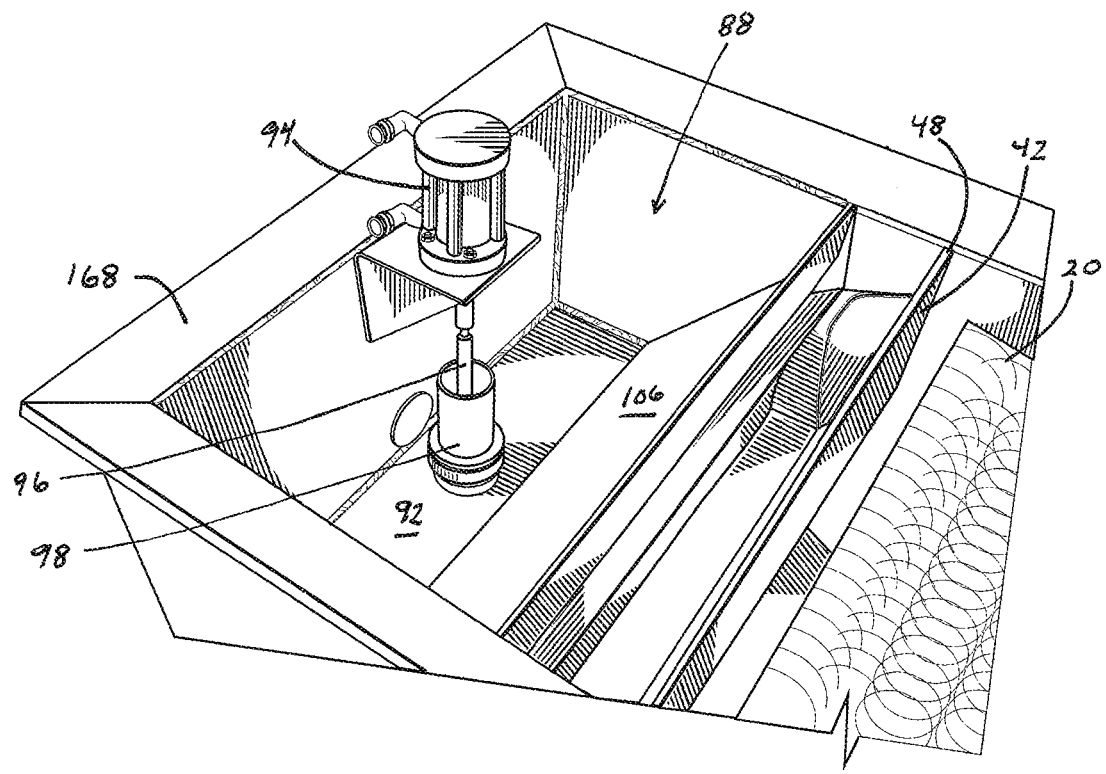
FIG. 10 is a perspective view of the clean solution chamber showing the adjustable outlet pipe and discharge using an air operated pancake cylinder and purge oil overflow weir.

The region of the tank directly below the rotating drum 56 and in fluid communication with the fluid conveyor 54 comprises the mechanical oil separation chamber 80 disposed between the quiescent coalescent chamber end wall 28, baffle end wall 62 and main tank side walls 70, 72. The heavier density portion of the composite solution (oil/water) comprises the water which will include at least a residual amount of contaminant or in this example the diluted oil product defining the diluted concentrate product 81 as shown in FIG. 4.

Stage 4—Secondary Quiescent/Coalescent Chamber

The secondary quiescent/coalescent chamber 80 comprises the immediate area of the main tank 12 around the quiescent/coalescent chamber 20 extending from the tank end wall 68 to the opposing tank end wall 168. It includes the portion of the main tank and is a continuation of the mechanical oil separation chamber 80 in that it is designed to allow more retention time within the unit for separation of fluids. The diluted concentrate fluid product 81 continues to travel underneath the inner chamber 20, up and around a stationary baffle 82 which extends upward vertically from the bottom floor 84 of the main tank 12 a selected distance to a selected point below the level of the diluted concentrate fluid 81 within the chamber 80. A portion of the diluted concentrate product containing a higher concentration of the concentrate product will spill over the baffle 82 and flow beneath an oil purge chamber baffle 84 which extends vertically from the bottom of a clean solution chamber 86 a selected distance above the main tank floor 84. The lower portion 90 of the tank end wall 168 connecting to the tank floor 84 extending over to the oil purge baffle 84 defines the oil purge chamber 88. The baffles disposed in the main tank provides a means to keep the diluted concentrate product 100 moving while allowing sufficient residence time for fluid separation. The purge oil tank 88 includes a top wall 92 disposed below the surface of the diluted concentrate product 81 in the secondary quiescent coalescent chamber 80.

Stage 5—Oil Purge Chamber

The oil purge chamber 88 receives the diluted concentrate product such as any residual tramp oils that was not removed by the rotating drum 56. In this compartment, the selected substrate for example, the tramp oils are allowed to continually build on the surface of the solution for a period of time within the chamber 88 until the Purge Cycle initiated. The Purge Cycle can be initiated by using a density meter that automatically detects the density (or specific gravity) such as the MICRO MOTION 7828 Direct Insertion Density Meter by Emerson Products or INDUMAX CL250/CLW50D inductive conductivity sensor produced by Endress and Hauser, which are examples of conventional density/concentration measuring devices which can be used to monitor the unwanted fluid related to the carrier fluid, for instance water, or by manually selecting the "Manual Purge" button on the main control panel. The Purge Cycle activates the pancake cylinder on the clean water outlet chamber. The cylinder raises the adjustable overflow tube which in turn raises the level in the unit as set forth in (Stage 6). Approximately two inches allowing the residual unwanted fluid (tramp oil) to overflow the weir in the oil purge chamber and flow out to the oil outlet piping. The purge cycle level is preset (but is adjustable) so that no water or other carrier solution other than the lighter unwanted fluid (tramp oil) is allowed to overflow. Thus, upon initiating a purge cycle, an electronically actuated cylinder 94 withdraws a plunger 96 from a collection tube 98 which extends through the top wall 92 and into the chamber 88 a selected depth. With the plunger in the downward extended position cleaned liquid (the higher density water portion of the diluted concentrate product) is allowed to enter the clean fluid tank 104 disposed above the purge tank 88 and between the main tank end wall 168 and a baffle 106 angled upward and extending a selected distance from and parallel to a weir 48 projecting from the top end wall 42 of the chamber 20. The cleaned product is discharged through the main tank end wall 168 discharge port 104. At a preset time, a Purge Cycle is initiated in which the level of the diluted concentrate product 81 amassing in the oil purge chamber 88 and the plunger 96 rises to block the discharge port 104 in the unit 88 and the liquid level is forced to rise (refer to Stage 6) a selected height of approximately two inches, and the more concentrated diluted concentrate product comprising residual oil overflows a weir 48 and is collected in the Oil Purge Chamber 110 and flows out to the oil outlet piping. The Purge Cycle level is preset (but is adjustable) so that no water or solution other than unwanted fluid (tramp oils) is allowed to overflow.

Stage 6—Clean Solution, Adjustable Outlet—

The clean solution chamber 86 receives clean solution from Stage 4. The clean fluid flows up through an adjustable outlet pipe and discharges out to process. The key feature in this section is the adjustable overflow outlet pipe. Adjustability is accomplished by using an air operated, pancake cylinder to raise the outlet pipe to a preset height. This feature is completely automatic and is used to raise the fluid level in the OWS in order to accomplish the purge cycle (refer to Stage 5). When the cylinder raises the outlet pipe, the level in the unit increases allowing unwanted fluids to overflow out of the unit. This feature is on a timed cycle and can be adjusted to any range of seconds to hours. Initially, the unit time setting is—Raise level for 30 seconds (raise outlet pipe), return to normal operating level for 20 minutes (lower outlet pipe to original position). The cycle is repeatable.

EXAMPLES

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

A Dual & Multi-Stage Oil Removal product for separation and removal of tramp oils from liquids employs boundary layer theory principles for flat-plate, laminar flows for estimating flow velocity profiles and liquid level heights to ensure effective capture and removal of tramp oils. The novel design features include a coalescing/quiescent tank to allow free oils to rise to the surface, water conveyance for carrying unwanted oils to composite drum for removal Composite drum for mechanical removal of unwanted oils, automatic purge cycle for removal of residual oils, and automatic adjustable overflow working in tandem with the purge feature.

| MODEL | FLOW RATE | WEIGHT EMPTY | VOLUME FULL | APPROXIMATE DIMENSIONS | | |
|-------|-----------|--------------|-------------|------|------|------|
|       | (GPM)     | (LBS)        | (GAL)       | A    | B    | C    |
| B-5   | to 5      | 400          | 50          | 16"  | 38"  | 27"  |
| B-10  | 5-10      | 500          | 65          | 20"  | 38"  | 27"  |
| B-25  | 10-25     | 750          | 125         | 36"  | 42"  | 33"  |
| B-50  | 25-50     | 900          | 215         | 40"  | 46"  | 36"  |

Figure 11:
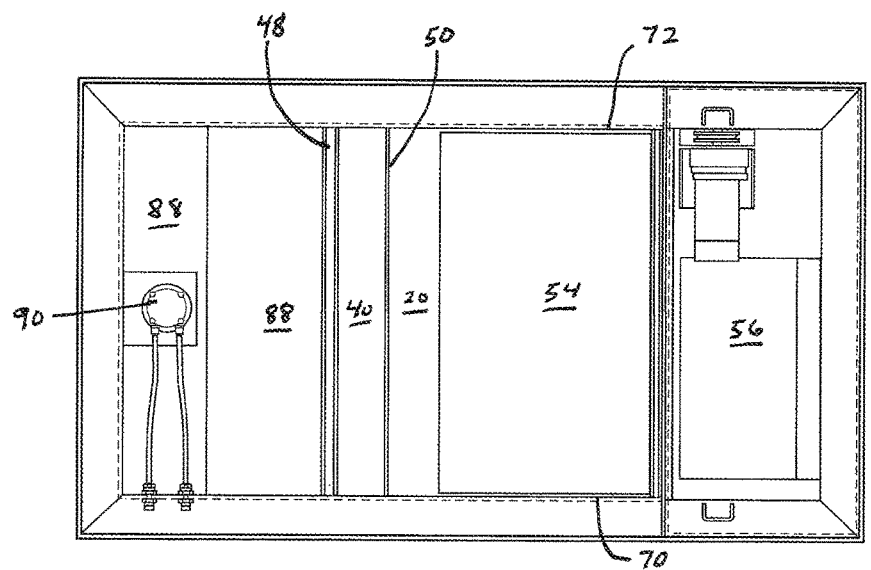
FIG. 11 is a top plan view of an oil water separator in accordance with the present invention showing a clean outlet compartment, purge compartment, purge outlet compartment, coalescing/quiescent tank, water conveyor and a single drum module.
Figure 12:
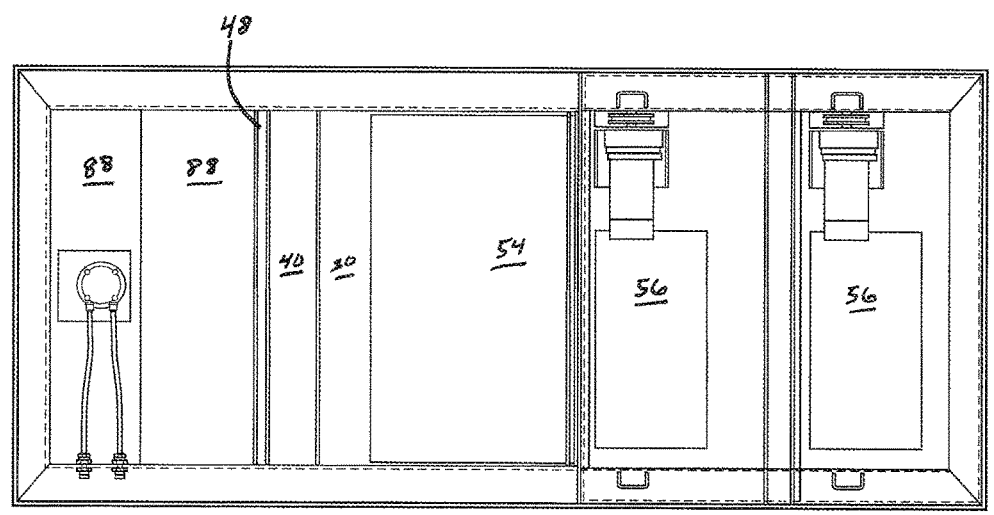
FIG. 12 is a top plan view of an oil water separator in accordance with the present invention showing a clean outlet compartment, purge compartment, purge outlet compartment, coalescing/quiescent tank, water conveyor and a double drum module.
Figure 13:
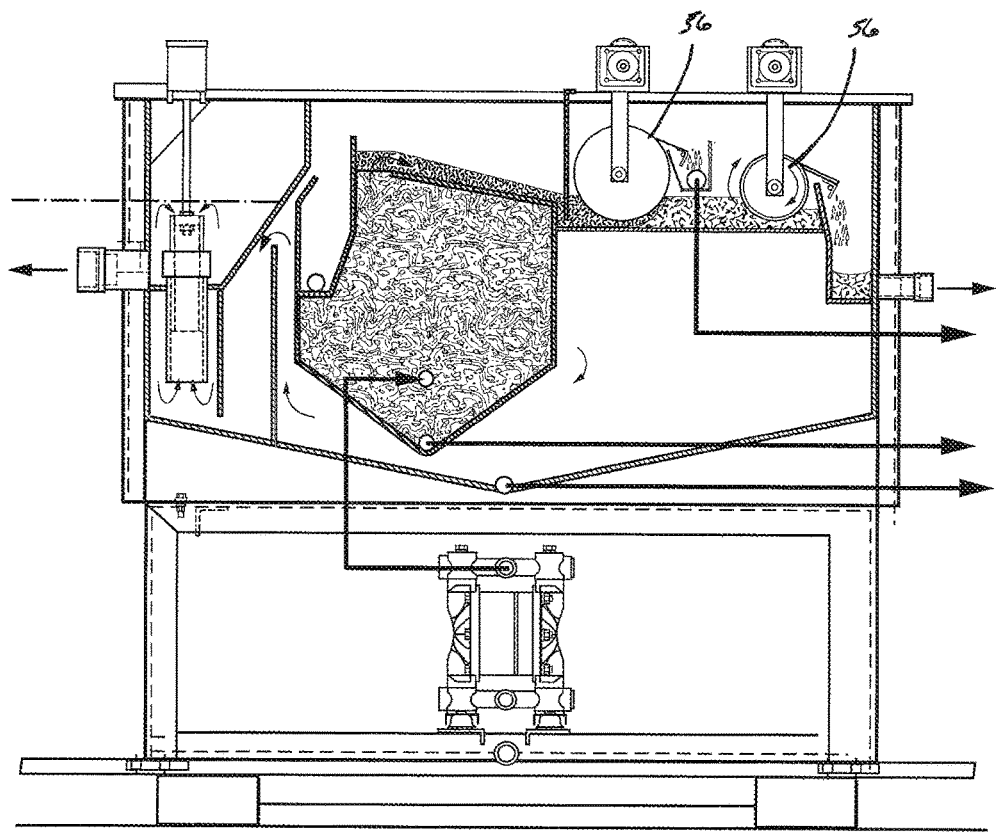
FIG. 13 is a side view showing the double drum oil water separator unit of FIG. 14.
Figure 14:
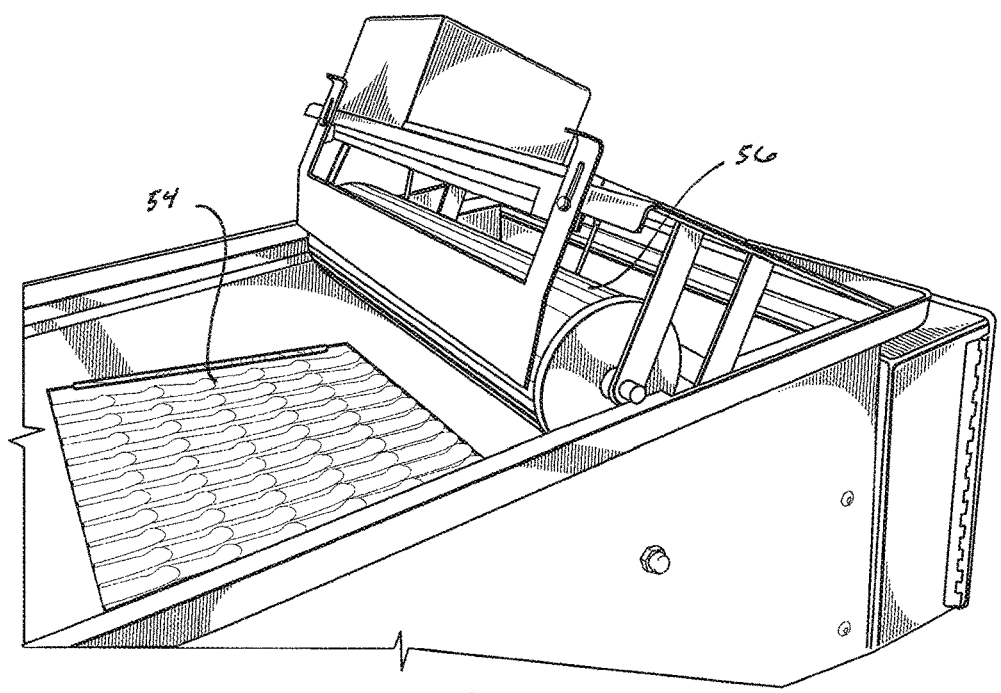
FIG. 14 is a perspective top view showing the rotating drum and wiper of an oil water separation unit in accordance with the present invention.
Figure 15:
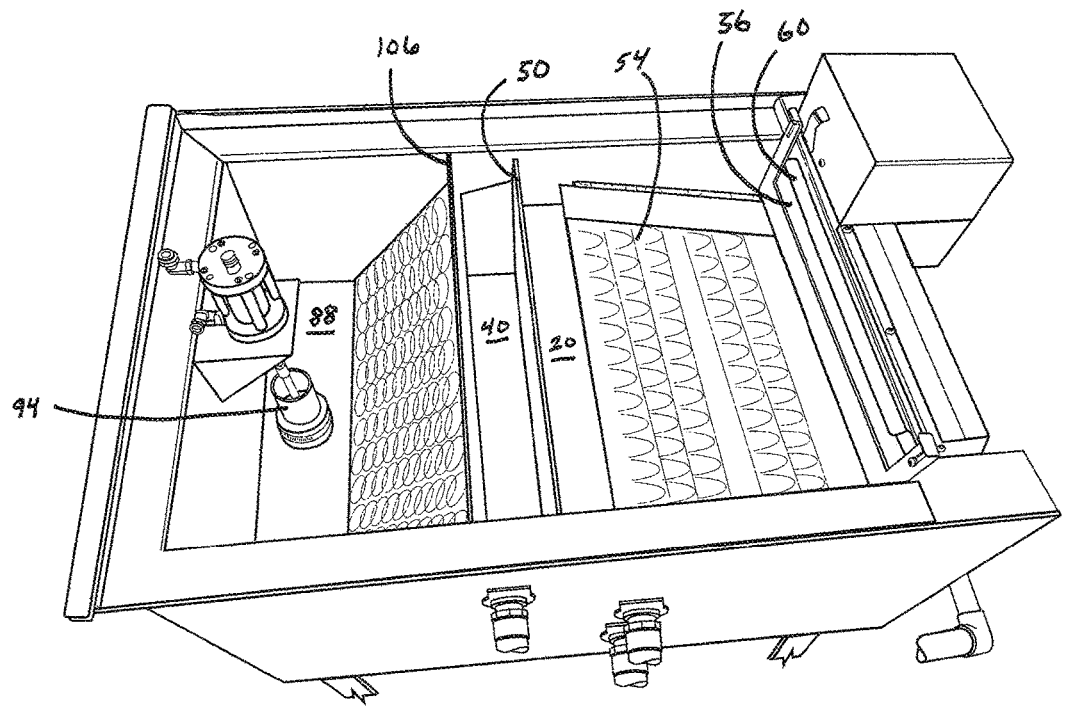
FIG. 15 is a perspective top view of an oil water separator in accordance with the present invention showing a clean outlet compartment, purge compartment, purge outlet compartment, coalescing/quiescent tank, water conveyor and a single drum module with wiper.
Figure 16:
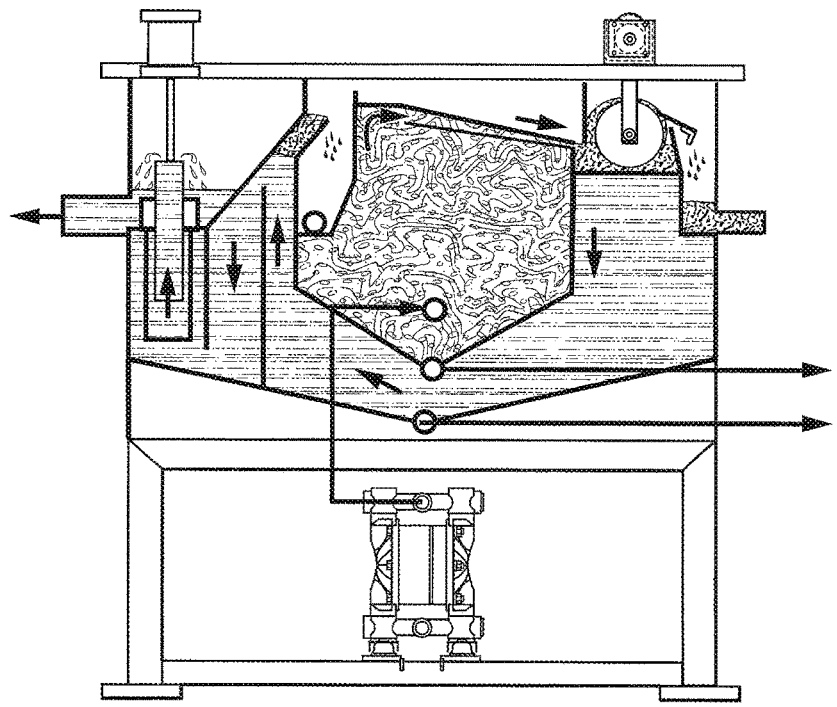
FIG. 16 is a flow diagram showing the features of an oil water separator in accordance with the present invention.

As illustrated in FIG. 11, in the above identified models, oily solution enters the Coalescing Chamber where tramp oil in solution is allowed to rise to the surface. The oil is carried to the Composite Drum Station via the water conveyor. The tramp oil adheres to the Composite Rotating Drum and is removed from solution. The Drum speed is adjustable ranging up to 9 RPM. The solution continues to flow underneath the Coalescing Tank, up and over Baffle #1, down and around Baffle #2, up through the Adjustable Overflow Tube and through the Solution Outlet port. Oil-free solution flows out the Solution Outlet port and back to process.

The Automatic Purge feature is fully automatic. At a pre-set time, the cylinder actuates raising the overflow tube to a pre-set height and residual tramp oil is forced over a weir and out the Purge Outlet port. This feature allows for the capture of residual tramp oils that potentially migrates past the Rotating Drum.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

We claim:

1. A method of separating oil from an oil and water composite fluid with an oil and water separator, comprising the steps of:

supporting a tank with a frame, said tank having opposing sidewalls connecting to a first end wall and a second end wall which join a pair of inclined bottom panels converging in the center forming an obtuse angle and said tank including a selected level with a fluid comprising a major amount of water and a minor amount of oil defining a water reservoir;

transporting an oil water composite fluid with a pump from a source to an oil water composite fluid inlet;

evacuating a coalescing chamber in fluid communication with said oil water composite fluid inlet, said coalescing chamber including a drain and an opening;

filling said coalescing chamber to a selected level whereby an overflow of said oil water composite fluid spills over said edge and said top surface of said inclined cover defining a liquid conveyor;

separating a major amount of an oil and a minor amount of said oil water composite fluid from said oil water composite fluid in said coalescing chamber including an inclined cover extending from a top edge of said second end wall inwardly over a selected portion of said coalescing chamber at a selected obtuse angle of up to about 50 degrees, said inclined cover including a top surface and a bottom surface and an edge therebetween extending between said opposing sidewalls and defining a weir;

accumulating said major amount of oil and said minor amount of oil water composite fluid from said liquid conveyor whereby a mechanical oil separation chamber in fluid communication with said coalescing chamber is disposed between said opposing end walls and said coalescing chamber second end wall and a baffle end wall of a concentrate product chamber at a selected depth within said reservoir;

rotating a drum of a in fluid communication with said mechanical oil separation chamber at a selected speed by a motor whereby a concentrate product comprising a lighter density liquid oil removably adheres, absorbs, or adsorbs to a surface of said rotating drum supported by a frame, said drum having a bottom portion in fluid communication with said major amount of oil and said minor amount of oil water composite fluid;

engaging said surface of said rotating drum at a selected angle with a wiper assembly comprising a blade extending across at least a portion of said rotating drum cooperatively removing at least a portion of said concentrate product therefrom;

removing said concentrate product with said wiper assembly in fluid communication with said concentrate product chamber disposed between said opposing side walls and a reservoir end wall and said rotating drum at a selected depth, said baffle end wall extending upward adjacent said rotating drum at a height above the level of the concentrate product and above the level of the major amount of oil and minor amount of oil water composite fluid, said concentrate product chamber including a discharge port for removal of said concentrate product;

purging said concentrate product with a purge oil chamber comprising an inner purge oil chamber baffle extending from said bottom panel of said coalescing chamber between said opposing side walls from a first end wall of said coalescing chamber inwardly and upward a selected distance above the level of the oil water composite fluid and an outer purge oil chamber baffle extending upward from said bottom panel of said tank and between said opposing side walls and spaced apart from said first end wall of said coalescing chamber and said first end wall of said tank a selected distance below the level of the oil water composite fluid;

forming a clean solution chamber disposed at a selected distance above said tank floor panel and said oil purge chamber baffle extending vertically from a bottom of said clean solution chamber; and providing a clean solution chamber in fluid communication with said oil purge chamber disposed between said opposing side walls above said tank floor adjacent said first tank wall and in fluid communication with an adjustable outlet pipe in fluid communication with a clean water discharge port.

* * * * *